United States Patent
Dudenbostel et al.

(10) Patent No.: US 11,245,117 B2
(45) Date of Patent: Feb. 8, 2022

(54) ELECTRODE PLATE OF AN ELECTROCHEMICAL BATTERY AND ELECTROCHEMICAL BATTERY COMPRISING SUCH ELECTRODE PLATE

(71) Applicant: Clarios Germany GmbH & Co. KG, Hannover (DE)

(72) Inventors: Andreas Dudenbostel, Neustadt (DE); Frank Johns, Sarstedt (DE); Peter Porscha, Wedemark/Brelingen (DE); Detlef Bauder, Garbsen (DE)

(73) Assignee: Clarios Germany GmbH & Co. KG, Hannover (DE)

(*) Notice: Subject to any disclaimer, the term of this patent is extended or adjusted under 35 U.S.C. 154(b) by 1009 days.

(21) Appl. No.: 14/054,379

(22) Filed: Oct. 15, 2013

(65) Prior Publication Data

US 2015/0104715 A1     Apr. 16, 2015

(51) Int. Cl.
    *H01M 4/73*     (2006.01)
    *H01M 4/14*     (2006.01)
    *H01M 4/20*     (2006.01)
    *H01M 10/12*     (2006.01)

(52) U.S. Cl.
    CPC .............. *H01M 4/73* (2013.01); *H01M 4/14* (2013.01); *H01M 4/20* (2013.01); *H01M 10/12* (2013.01); *Y10T 29/10* (2015.01)

(58) Field of Classification Search
    CPC ....................................................... H01M 4/74
    See application file for complete search history.

(56) References Cited

U.S. PATENT DOCUMENTS

| | | | | |
|---|---|---|---|---|
| 4,982,482 A | * | 1/1991 | Wheadon | H01M 2/0242 29/2 |
| 2013/0029229 A1 | * | 1/2013 | Mack | H01M 2/1613 429/241 |

FOREIGN PATENT DOCUMENTS

| | | | | |
|---|---|---|---|---|
| DE | 0109588 A2 | * | 5/1984 | ............... H01M 4/20 |
| EP | 0109588 A2 | | 5/1984 | |
| JP | 63121251 A | | 5/1988 | |
| JP | 63121252 A | | 5/1988 | |
| WO | WO 2011130514 A1 | * | 10/2011 | ............ H01M 2/1613 |

* cited by examiner

*Primary Examiner* — Nathanael T Zemui
(74) *Attorney, Agent, or Firm* — Boardman & Clark LLP

(57) ABSTRACT

An electrochemical battery is disclosed. The electrochemical battery has an electrode plate comprising a frame and a generally flat grid connected to the frame, the frame comprising at least a top frame member having a contact lug, wherein the grid comprises a plurality of grid wires and a plurality of window-like open areas between the grid wires, further comprising an active mass within the open areas and/or on the grid wires, wherein the electrode plate comprises on one outer surface or on both opposing outer surfaces of the active mass a pattern of grooves, wherein the grooves extend diagonally from a position closer to the top frame member to a position further away from the top frame member. A method for producing an electrode plate is also disclosed.

21 Claims, 4 Drawing Sheets

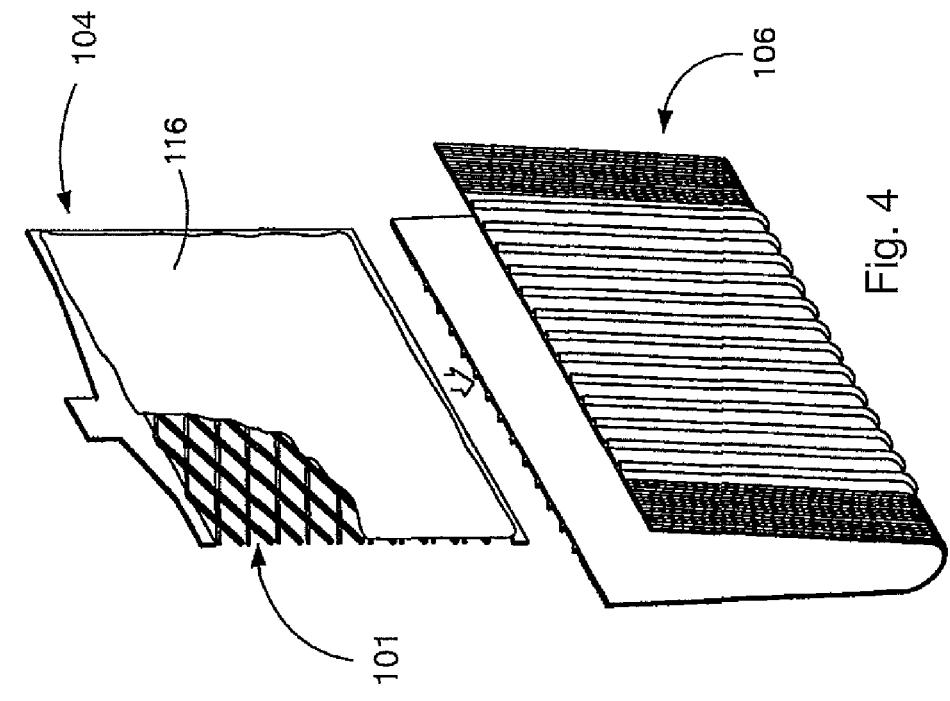
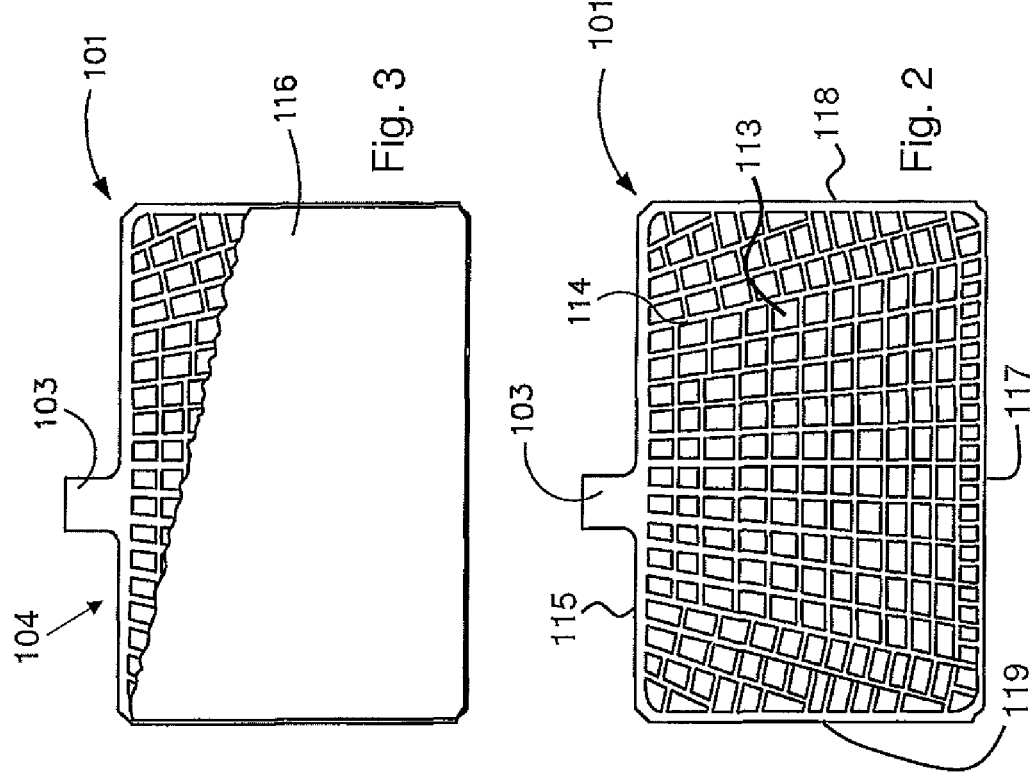

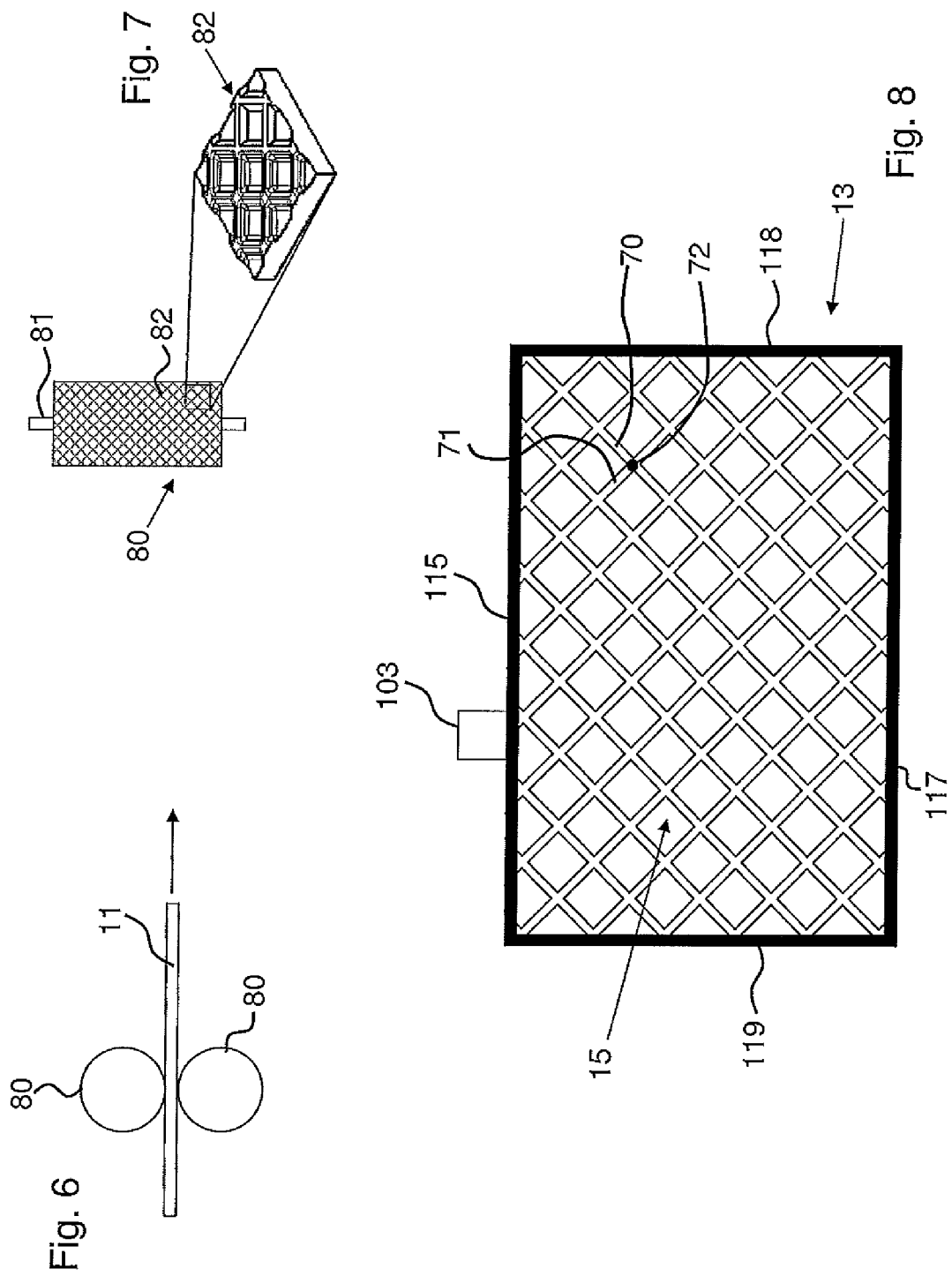

ELECTRODE PLATE OF AN ELECTROCHEMICAL BATTERY AND ELECTROCHEMICAL BATTERY COMPRISING SUCH ELECTRODE PLATE

TECHNICAL FIELD OF THE INVENTION

The present invention relates to the field of electrochemical batteries, which are also called secondary batteries or rechargeable batteries, e.g. lead acid batteries including batteries for vehicle starting, lighting and ignition applications, marine batteries, commercial batteries, industrial batteries, batteries for use with hybrid-electric vehicles, micro-hybrid vehicles etc. The present invention more specifically relates to electrode plates for such electrochemical batteries and methods for making such electrode plates.

BACKGROUND OF THE INVENTION

Such electrochemical batteries are able to store electrical energy by means of reversible electrochemical reactions. The battery comprises electrode plates and a liquid electrolyte. When the battery is filled with the liquid electrolyte for the first time, it is desired that the electrolyte evenly distributes among the electrode surfaces. Particularly in cases where the electrode have a plate-like shape, the electrolyte can not always be distributed in a sufficient manner, since the electrode plates are densely packed within the battery housing. Further difficulties arise when the electrodes are covered with a liquid absorbing material as it is the case with AGM batteries It is therefore an object of the invention to optimise the even distribution of the electrolyte among the electrode plates when the battery is filled with the liquid electrolyte for the first time.

SUMMARY OF THE INVENTION

Accordingly, an electrode plate of an electrochemical battery is provided, the electrode plate comprising a frame and a generally flat grid connected to the frame, the frame comprising at least a top frame member having a contact lug, wherein the grid comprises a plurality of grid wires and a plurality of window-like open areas between the grid wires, further comprising an active mass within the open areas and/or on the grid wires, wherein the electrode plate comprises on one outer surface or on both opposing outer surfaces of the active mass a pattern of grooves, wherein the grooves extend diagonally from a position closer to the top frame member to a position further away from the top frame member.

The pattern of grooves which extend diagonally allow for an optimised even distribution of the liquid electrolyte among the surfaces of the electrode plates. The grooves establish a system of channels through which the electrolyte can flow, even if the electrode plates are densely packed within the battery housing. A further positive effect is that the effective surface of the electrode plate is increased, compared to an electrode plate without the pattern of grooves. This further enhances the performance and electrical capabilities of the electrochemical battery. For example, through the pattern of grooves the surface of the electrode plate can be increased by a value in the range of 5% to 10%, e.g. 7%. The resulting electrochemical battery shows better performance, like a better voltage level cranking behaviour if used as a vehicle starting battery. Further, a more even distribution of sulfate can be achieved. Further, the water consumption of the electrochemical battery is reduced.

The direction of the extension of the grooves in a diagonal way has the advantage that the liquid electrolyte can be guided to different horizontal positions of the electrode plate and also allows for removing air between the electrode plates.

The longitudinal extension of the grooves may reach from the upper edge of top frame member of the electrode plate to the bottom edge or bottom frame member.

The grooves can be straight, linear grooves or curved grooves, or a combination thereof. The cross-sectional profile of the grooves can be U- or V-shaped, trapezoidal, semicircle formed or any rectangular form.

The electrode plate can have the pattern of grooves only on one side or on both opposing sides, namely on both opposing outer surfaces of the active mass. If the pattern of grooves is only realised on one side of the electrode plate, it is advantageous to stack several electrode plates in a way that their sides comprising the pattern of grooves face in the same direction.

A further electrode plate is provided where the grooves extend diagonally in a monotonic manner further away from the top frame member. This has the advantage that any caverns between electrode plates were air can be captured are avoided. This can be further improved by grooves extending diagonally in a strictly monotonic manner further away from the top frame member. The term "monotonic" is meant in the mathematical sense.

A further electrode plate is provided having a pattern of grooves which comprises a plurality of crossing grooves which define a plurality of crossing points between the grooves. This further supports the even distribution of the liquid electrolyte and the removal of air between the electrode plates.

A further electrode plate is provided where the plurality of crossing grooves defines a waffle pattern on the surface of the active mass.

A further electrode plate is provided wherein one, several or all of the grooves extend in a linear way diagonally over the surface of the active mass. The linear grooves can extend diagonally at an angle with respect to the top frame member in the area of 30° to 60°, in particular in the area of 40° to 50°, with reference to a 360° scale. In this way, the effects of even electrolyte distribution and air removal between electrode plates can be further improved.

A further electrode plate is provided wherein a layer of mass holding material is located on the outer surface of the active mass, wherein the layer of mass holding material comprises the pattern of grooves. The mass holding material has the advantage that the active mass is most securely fixed to the grid of the electrode plate, at least during early production steps of the electrochemical battery. For example, a pasting paper can be used as mass holding material. The mass holding material can dissolve in the finished electrochemical battery by means of the liquid electrolyte, which can be e.g. acid sulfur.

A further electrode plate is provided wherein the grooves have a depth in the area of 0.1 mm to 1.0 mm, in particular in the area of 0.2 mm to 0.3 mm. The distance between neighbouring grooves which do not intercept can be in the range of 3 mm to 15 mm, in particular in the range of 6 mm to 10 mm.

A further electrode plate is provided comprising a grid which is a stamped grid. The electrode plate can be a positive electrode plate. The pattern of grooves can be a regular pattern.

A further electrode plate is provided having a frame which comprises the top frame member, a bottom frame member and a left side frame member and a right side frame member, wherein the top frame member is connected to the bottom frame member via the left side frame member and the right side frame member, wherein the grid is located within the frame. This provides for an electrode plate and a grid arrangement having an increased mechanical stability, in particular in the bottom area of the grid.

As far as terms like horizontal, vertical, upper, lower, top, bottom and the like are used, these terms refer to the orientation of the electrode plate in the battery housing in the specified normal or operational orientation of the battery. The specified normal orientation of the battery is usually an orientation where the bottom of the battery housing is horizontally positioned. In such case also the upper frame member is in a horizontal position.

A further electrode plate is provided wherein the active mass is covered with a liquid absorbing material which is arranged for absorbing a liquid electrolyte of the electrochemical battery. In case also a mass holding material is located on the outer surface of the active mass, the liquid absorbing material can be placed on top of the mass holding material. The liquid absorbing material can be e.g. a glass mat or any other woven or non-woven sheet material. In particular, the liquid absorbing material can be an absorbent glass mat which is used for batteries of the AGM type (AGM=absorbent glass mat).

Further, an electrochemical battery is provided comprising at least one electrode plate of the aforementioned type.

Further a battery is provided which comprises a liquid electrolyte which is absorbed within a liquid absorbing material covering the active mass of at least one electrode plate. The electrochemical battery can be an AGM battery.

The combination of the pattern of grooves with a battery of the AGM type comprises further advantages, since the liquid absorbing material of AGM type batteries provides for further resistance against the desired even distribution of the liquid electrolyte. Therefore, in particular batteries of the AGM type can be significantly improved by the present invention.

Further, a method for producing an electrode plate of an electrochemical battery is provided, comprising the steps of:

a) producing a grid arrangement comprising a frame and a generally flat grid connected to the frame, the frame comprising at least a top frame member having a contact lug, wherein the grid comprises a plurality of grid wires and a plurality of window-like open areas between the grid wires, b) applying active mass into the open areas and/or on the grid wires of the grid arrangement, c) pressing a pattern of grooves in the outer surface of the active mass on one side of the electrode plate or on both opposing sides.

The step of pressing the pattern of grooves into the surface of the active mass can be done by pressing a stamp having a complementary shape to the pattern of grooves to be produced. It is also possible to press the pattern of grooves into the active mass in a continuous process, by transporting the electrode plate along a roller arrangement, e.g. a single roller, if the pattern of grooves shall be produced only on one side of the electrode plate, or through a pair of rollers through which the electrode plate is guided.

The step of pressing a pattern of grooves in the outer surface of the active mass can be applied before or after a mass holding material and/or a liquid absorbing material is placed on the electrode. In such case the stamp of roller forms the pattern of grooves into the active mass through the layer of mass holding material and/or a liquid absorbing material.

These and other features and advantages of devices, systems, and methods according to this invention are described in or are apparent from the following detailed description of various examples of embodiments.

BRIEF DESCRIPTION OF DRAWINGS

Various examples of embodiments of the systems, devices and methods according to this invention will be described in detail, with reference to the following figures, wherein:

FIG. 2 is an elevational view of a battery grid showing a positive battery grid.

FIG. 3 is an elevational view of a positive electrode plate, including the battery grid shown in FIG. 2, showing the pasting material cut away to reveal the battery grid.

FIG. 4 is a perspective view of a negative electrode plate, showing the pasting material cut away to reveal the negative battery grid and a separator for covering the negative electrode plate shown in FIG. 4.

FIG. 6 is a side view of a roller arrangement for rolling an electrode plate.

FIG. 7 is an elevational view on a roller of FIG. 6, further showing an enlarged section of the surface of the roller.

FIG. 8 is an elevational view of an electrode plate comprising a waffle pattern on the surface of the active mass.

Figure 1:
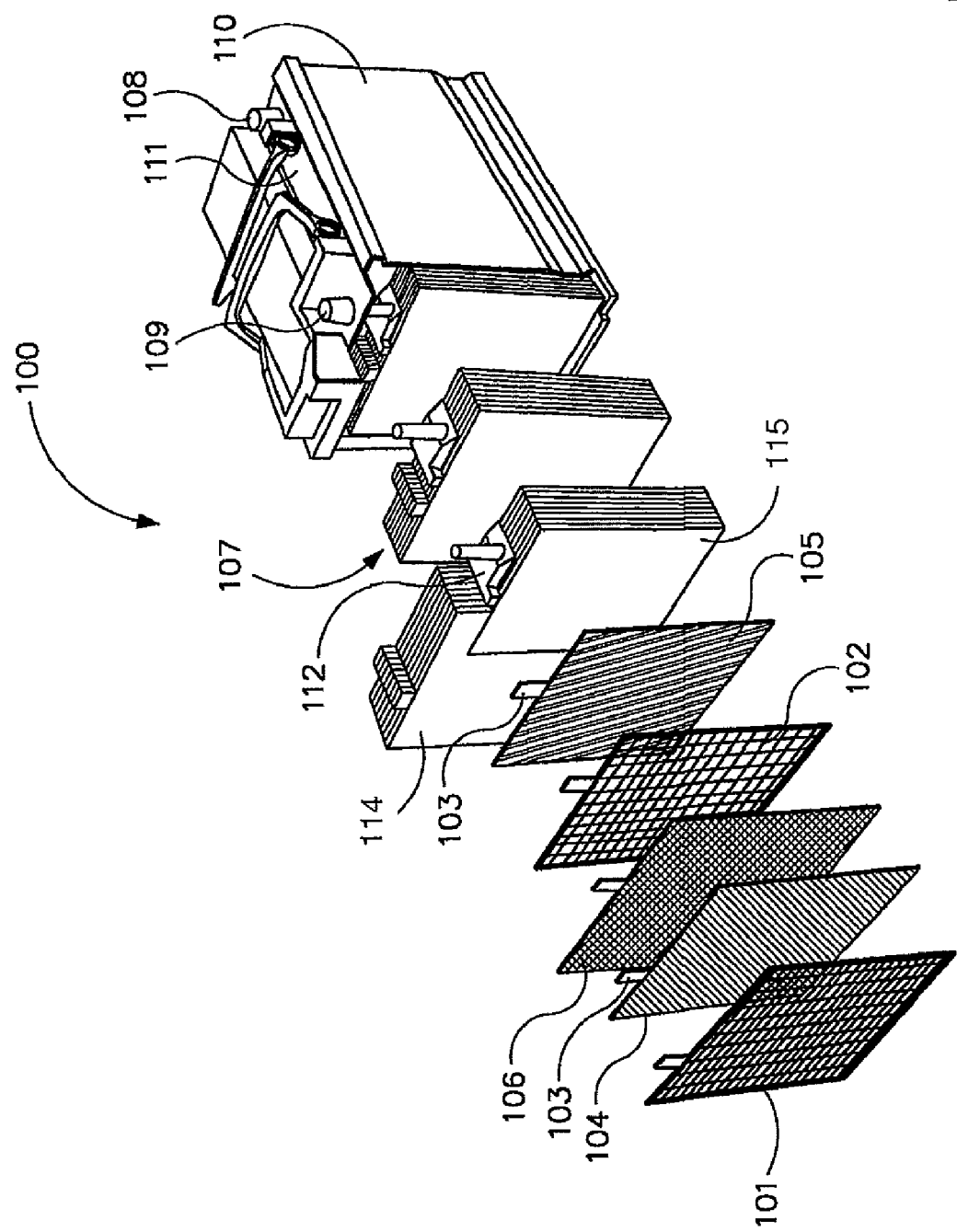
FIG. 1 is an exploded perspective view of an electrochemical battery.

It should be on understood that the drawings are not necessarily to scale. In certain instances, details are not necessary to the understanding of the invention or render other details difficult to perceive may have been omitted. It should be understood, of course, that the invention is not necessarily limited to the particular embodiments illustrated herein. Same reference numerals are used throughout the drawings.

DETAILED DESCRIPTION OF THE ILLUSTRATED EMBODIMENTS

Using FIG. 1, the general composition of an electrochemical battery 100 is described in an exemplary way. The battery 100 can be a lead acid battery comprising a liquid electrolyte, e.g. acid sulfur. The battery 100 comprises a housing 110, which houses one or more stacks or sets 107 of electrode plates. The battery 100 comprises a number of electrode plate sets according to the number of cells of the battery. The electrode plate sets 107 are located within several chambers of the housing 110 which are separated by intermediate walls. The electrode plate sets 107 are connected in series connection by internal connecting elements within the housing 110. The plate sets 107 comprise positive and negative electrode plates in an alternating manner. The positive plates of the electrode plate set on one side and the negative plates of the electrode plate set on the opposing other side are electrically connected with external battery poles 108, 109, which are mounted within a cover part 111 of the battery housing 110. The battery poles 108, 109 are the outer electrical connections of the battery 100 for providing electrical energy to electrical consumers.

The negative electrode plates are shown in FIG. 1 as negative plate set 115, the positive electrode plates are shown as positive plate set 114. Further, FIG. 1 shows in an exemplary way single electrode plates, particularly a negative electrode plate 105, comprising a negative generally flat grid 102 made of lead or a lead alloy, and a positive electrode plate 104, comprising a positive generally flat grid 101, made of lead or lead alloy. The positive electrode plate 104 and the negative electrode plate 105 shown in FIG. 1 are already covered with active mass. The active mass covers the grid wires and window-like open areas between the grid wires.

As it can be seen in FIG. 1, a grid 101, 102 comprises a plurality of grid wires defining a plurality of window-like open areas between the grid wires. The positive and/or the negative grid 101, 102 can be manufactured e.g. by a stamping or punching process or by means of other processes like casting and/or rolling.

The positive electrode plate 104 is, in addition, separated from the neighbouring negative electrode plates 105 by means of a separator 106. The separator 106 can be formed like a pocket or bag which contains the positive electrode plate 104 and separates it against neighbouring electrode plates.

Positive electrode plates 104 comprise contact lugs 103 which serve for electrically contacting the electrode plates of the positive plate set 114 together in a parallel connection. The negative electrode plates 105 comprise contact lugs 103 which serve for electrically connecting the electrode plates in the negative plate set 115 together in a parallel connection. The connection can be established by means of cast-on straps 112 which can be soldered or cast on the contact lugs 103.

The battery 100 of FIG. 1 can comprise one or more electrode plates according to the invention, e.g. in the form of the positive electrode plates 104.

FIG. 2 shows the positive grid 101 in an elevational view. It can be seen that the grid 101 comprises a plurality of grid wires 114 which surround a plurality of window-like open areas 113. For improving electrical and mechanical capabilities of the grid, the grid 101 can comprise an outer frame surrounding the grid wires 114 and open areas 113. The outer frame can comprise one or more of a top frame member 115, a bottom frame member 117, a left side frame member 119 and a right side frame member 118.

FIG. 3 shows a grid 101 which is covered with active mass, at least partly. The active mass is applied in a pasty form. This process is also called pasting process. FIG. 4 shows the battery grid 101 covered with the active mass 116 during insertion into a pocket-like separator 106.

Figure 5:
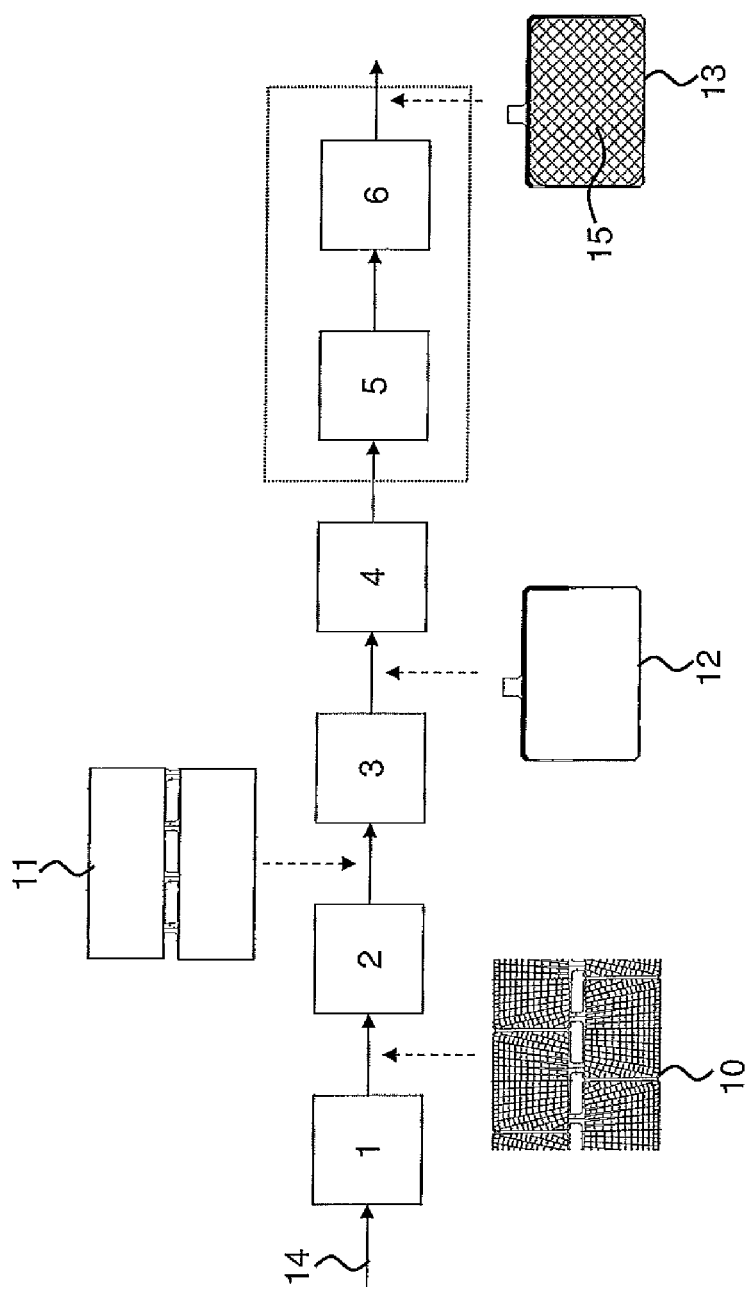
FIG. 5 is a schematic view of an electrode plate producing facility.

FIG. 5 shows in a schematic way a facility for producing an electrode plate, in particular a positive electrode plate 104 as it was described herein before. The facility comprises several stations 1, 2, 3, 4, 5, 6, namely a grid producing station 1, a pasting station 2, a separating station 3, a storage station 4, a pasting paper applying station 5 and a pressing station 6. The stations 1, 2, 3, 4, 5, 6 are, as depicted in FIG. 5, arranged in a sequential manner. Raw material 14 which is fed to the grid producing station 1 is therefore sequentially or in a step-by-step manner modified into the resulting electrode plate.

The grid producing station 1 converts the raw material 14, which is lead or a lead alloy, into a continuous strip of grids. The strip 10 comprises two threads. The conversion process within the grid arrangement producing station 1 can comprise a casting process, a rolling process and/or a stamping or punching process. The two threaded grid strip 10 comprises an upper and a lower thread of grid 101 which are connected with each other. The upper and the lower thread are connected to each other via the contact lugs 103 of the grids 101. The two threaded grid strip 10 will be cut at a later stage in order to separate the grids 101.

As a next step, the two threaded grid strip 10 is guided through the pasting station 2. In the pasting station 2 the active mass is pasted onto the grid strip 10. This results in the two threaded pasted grid strip 11 shown in FIG. 5.

According to FIG. 5, the separating station 3 is located after the pasting station 2. This is only one of several possible realisations of the facility of FIG. 5. It is also possible to locate the separating station 3 at another position, e.g. after the pressing station 6. However, it is now assumed that the separating station is at the position shown in FIG. 5. In the separating station 3 the two threaded pasted grid strip 11 is cut into the single electrode plates 104 which are already covered with the active mass. This is shown in FIG. 5 as electrode plate 12.

Before applying further production steps to the electrode plate 12, a pre-drying step can be done for drying the active mass. Also, a curing step can be done at this point. For this purpose the electrode plate 12 can be temporarily stored in the storage station 4. Alternatively, the electrode plate 12 can be directly supplied to the next station, namely to the pasting paper applying station 5.

In the pasting paper applying station 5, the pasting paper is applied on the active mass. However, this is an optional step which is usually only foreseen if the separating of the electrodes is done at a later stage, e.g. after the rolling of the electrode plates in the pressing station 6.

After the optional pasting paper station 5 the electrode plate 12 is supplied to the pressing station 6. In the pressing station 6 a pattern of grooves is pressed or printed into the surface of the active mass. This is shown in FIG. 5 by means of the resulting electrode plate 13 having a waffle pattern like structure 15 of grooves on its surface.

The pattern of grooves can be pressed into the active mass by means of a stamp. This can be done, if the electrode plates are already separated, in an electrode plate by electrode plate single manner.

Alternatively, the separating step of the electrode plates can be moved to a location behind the pressing station 6. In other words, the separating station 3 is in such case located at a position after pressing station 6. In this case, a continuous pressing process can be applied in the pressing station 6 to the two threaded pasted grid strip 11. In this case, the pressing process can be performed by a rolling process using profiled rollers.

The pressing process using profiled rollers is further described with reference to FIGS. 6 and 7. FIG. 6 shows in an exemplary manner a set of profiled rollers 80. The pasted grid strip 11 is guided through the rollers 80 and thereby pressed in a way that the pattern of grooves is produced on the outer surfaces of the active mass. FIG. 7 shows one of the rollers 80 in an elevational view showing the stamp pattern 82 on its outer surface. The roller 80 is rotated around a rotating axis 81 during the rolling process. FIG. 7 shows a section of the stamp pattern 82 of the roller 80 in an enlarged manner. As it can be seen, the outer surface of the roller 80 comprises the waffle pattern like formed stamp structure. This stamp structure is formed in a complementary way into the active mass of the electrode plate.

The result can be seen in FIG. 8. The pattern of grooves 15 comprises diagonally extending grooves 70 and diagonally extending grooves 71 which intersect with the grooves 70. This results in a number of intersection or crossing points 72 between the grooves 70, 71. The grooves 70, 71 establish a system of channels on the outer surface of the electrode plate 13 allowing the liquid electrolyte flowing from the upper side of the electrode plate 13 down to the bottom, even if several electrode plates are densely packed to plate stacks 107. Through the system of channels air between the electrode plates can be removed.

Those reviewing this disclosure will appreciate that various exemplary embodiments have been shown and described, and that according to various exemplary embodiments, features associated with one exemplary embodiment may be used with features included in other exemplary embodiments.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the battery module having electrochemical cells with integrally formed terminals as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the battery may be non-cylindrical (e.g., oval, rectangular, etc.), the position of elements may be reversed or otherwise varied (e.g., orientation of terminals), and the battery could be a number of different of types (e.g., nickel metal hydride, lithium ion, lithium polymer, etc.). Accordingly, all such modifications are intended to be included within the scope of the present inventions. The order or sequence of any process or method steps may be varied or re-sequenced according to exemplary embodiments. Other substitutions, modifications, changes and omissions may be made in the design, operating conditions and arrangement of the various exemplary embodiments without departing from the scope of the present invention.

The technical effects and technical problems in the specification are exemplary and are not limiting. It should be noted that the embodiments described in the specification may have other technical effects and can solve other technical problems.

We claim:

1. An electrode plate of an electrochemical battery, the electrode plate comprising a frame and a generally flat grid connected to the frame, the frame comprising at least a top frame member having a contact lug, wherein the grid comprises a plurality of grid wires arranged in a pattern and a plurality of window-like open areas between the grid wires, further comprising an active mass within the open areas and/or on the grid wires, wherein the electrode plate comprises on one outer surface or on both opposing outer surfaces of the active mass a pattern of grooves, wherein the grooves extend diagonally from a position closer to the top frame member to a position further away from the top frame member, wherein the pattern of grooves comprises a first group of diagonally extending grooves and a second group of diagonally extending grooves, wherein the grooves of the first group of grooves intersect with the grooves of the second group of grooves, wherein the pattern of grooves forms a plurality of crossing points between the grooves of the first group of grooves and the grooves of the second group of grooves, wherein a two-dimensional arrangement of the pattern of the grid wires differs from a two-dimensional arrangement of the pattern of grooves when looking on the one outer surface of the active mass of the electrode plate where the pattern of grooves is formed, and wherein the pattern of the grid wires is only partially covered by the pattern of grooves.

2. The electrode plate of claim 1, wherein the grooves extend diagonally in a monotonic manner further away from the top frame member.

3. The electrode plate of claim 1, wherein the grooves extend diagonally in a strictly monotonic manner further away from the top frame member.

4. The electrode plate of claim 1, wherein the plurality of crossing grooves defines a waffle pattern on the surface of the active mass.

5. The electrode plate of claim 1, wherein one, several or all of the grooves extend in a linear way diagonally over the surface of the active mass.

6. The electrode plate of claim 5, wherein the linear grooves extend diagonally at an angle with respect to the top frame member in the area of 30° to 60°.

7. The electrode plate of claim 1, wherein a layer of mass holding material is located on the outer surface of the active mass, wherein the layer of mass holding material comprises the pattern of grooves.

8. The electrode plate of claim 1, wherein the grooves have a depth in the area of 0.1 mm to 1.0 mm.

9. The electrode plate of claim 1, wherein the distance between neighbouring grooves which do not intersect is in the range of 3 mm to 15 mm.

10. The electrode plate of claim 1, wherein the pattern of grooves is a regular pattern.

11. The electrode plate of claim 1, wherein the grid is a stamped or punched grid.

12. The electrode plate of claim 1, wherein the electrode plate is a positive electrode plate.

13. The electrode plate of claim 1, wherein the frame comprises the top frame member, a bottom frame member and a left side frame member and a right side frame member, wherein the top frame member is connected to the bottom frame member via the left side frame member and the right side frame member, wherein the grid is located with the frame.

14. The electrode plate of claim 1, wherein the active mass is covered with a liquid absorbing material which is arranged for absorbing a liquid electrolyte of the electrochemical battery.

15. An electrochemical battery comprising at least one electrode plate according to claim 1.

16. The electrochemical battery of claim 15, wherein the electrochemical battery comprises a liquid electrolyte which is absorbed within a liquid absorbing material covering the active mass of at least one electrode plate.

17. The electrochemical battery of claim 15, wherein the electrochemical battery is an AGM battery.

18. A method for producing an electrode plate of an electrochemical battery comprising the steps of:
 a) producing a grid arrangement comprising a frame and a generally flat grid connected to the frame, the frame comprising at least a top frame member having a contact lug, wherein the grid comprises a plurality of grid wires and a plurality of window-like open areas between the grid wires, wherein the plurality of grid wires is arranged in a pattern,
 b) applying active mass into the open areas and/or on the grid wires of the grid arrangement,
 c) pressing a pattern of grooves in the outer surface of the active mass on one side of the electrode plate or on both opposing sides, wherein the pattern of grooves comprises a first group of diagonally extending grooves and a second group of diagonally extending grooves, wherein the grooves of the first group of grooves intersect with the grooves of the second group of grooves, and wherein the pattern of grooves forms a plurality of crossing points between the grooves of the first group of grooves and the grooves of the second group of grooves, wherein a two-dimensional arrangement of the pattern of the grid wires differs from a two-dimensional arrangement of the pattern of grooves when looking on the one outer surface of the active mass of the electrode plate where the pattern of grooves is formed, and wherein the pattern of the grid wires is only partially covered by the pattern of grooves.

19. The electrode plate of claim 1, wherein the grooves have a depth in the area of 0.2 mm to 0.3 mm.

20. The electrode plate of claim 1, wherein the linear grooves extend diagonally at an angle with respect to the top frame member in the area of 40° to 50°.

21. The electrode plate of claim 1, wherein the distance between neighbouring grooves which do not intersect is in the range of 6 mm to 10 mm.

* * * * *